US007004333B2

(12) United States Patent
Marcotullio et al.

(10) Patent No.: US 7,004,333 B2
(45) Date of Patent: Feb. 28, 2006

(54) PROCESS FOR THE SEPARATION OF HOLLOW GLASS MICROSPHERES FROM MUDS CONTAINING THEM

(75) Inventors: Armando Marcotullio, Milan (IT); Raffaella Monga, Milan (IT); Giuseppe Belmonte, Turin (IT); Angelo Calderoni, Milan (IT); Giovanni Ferrari, Piacenza (IT)

(73) Assignees: ENI S.p.A., Rome (IT); ENITECNOLOGIE S.p.A., San Donato Milanese (IT)

( * ) Notice: Subject to any disclaimer, the term of this patent is extended or adjusted under 35 U.S.C. 154(b) by 131 days.

(21) Appl. No.: 10/433,471

(22) PCT Filed: Nov. 13, 2001

(86) PCT No.: PCT/EP01/13173

§ 371 (c)(1),
(2), (4) Date: Nov. 20, 2003

(87) PCT Pub. No.: WO02/48063

PCT Pub. Date: Jun. 20, 2002

(65) Prior Publication Data

US 2004/0089591 A1 May 13, 2004

(30) Foreign Application Priority Data

Dec. 15, 2000 (IT) .......................... MI2000A2714

(51) Int. Cl.
*B04B 5/12* (2006.01)
(52) U.S. Cl. ...................... 209/725; 209/710; 209/711; 209/724; 428/402; 428/406
(58) Field of Classification Search ................ 209/710, 209/711, 712–734
See application file for complete search history.

(56) References Cited

U.S. PATENT DOCUMENTS

| 2,978,340 A | 4/1961 | Alford et al. |
| 3,035,042 A | 5/1962 | Hoyt |
| 4,252,193 A | 2/1981 | Powers et al. |
| 4,370,166 A | 1/1983 | Powers et al. |

FOREIGN PATENT DOCUMENTS

EP  0 565 187  10/1993

*Primary Examiner*—Donald Walsh
*Assistant Examiner*—Jonathan R Miller
(74) *Attorney, Agent, or Firm*—Oblon, Spivak, McClelland, Maier & Neustadt, P.C.

(57) ABSTRACT

Process for recovering at least 70% of hollow glass microspheres having an average diameter, according to the ASTM D1214-1989, ranging from 5 to 200 $\mu$m contained in a mixture of drilling mud and cuttings which comprises: a) screening, if necessary, the mixture through one or more 5 to 20 mesh sieves; b) feeding the screened mixture to one or more cyclones and/or hydrocyclones arranged in series, each of which is fed with a volume flow-rate from 1.5 to 10 times higher than the maximum nominal operating value.

18 Claims, No Drawings

PROCESS FOR THE SEPARATION OF HOLLOW GLASS MICROSPHERES FROM MUDS CONTAINING THEM

The present invention relates to a process for the separation of hollow glass microspheres from muds containing them.

More specifically, the present invention relates to a process for the separation of hollow glass microspheres contained in muds and cuttings produced during the drilling of oil wells or wells for the production of natural gas.

As it is well known, during the drilling of wells for the production of oil or natural gas, particular fluids are used, commonly called drilling fluids or muds, whose purpose is of primary importance for the correct and safe handling of the well preparation phase. As described, for example, in U.S. Pat. No. 3,035,042, drilling fluids have numerous functions: they are used for cooling and lubricating the head of the drilling bit probe; they remove and carry to the surface the cuttings produced during drilling; they help to seal and consolidate the well walls; they keep the cuttings in suspension when the drilling is momentarily stopped; they contribute to forming a hydrostatic pressure which serves to control and regulate the flow towards the surface of oil/gas under pressure when the bit reaches the reservoir.

The most traditionally used drilling fluids consist of aqueous or oily dispersions of clay and/or sandy materials such as bentonite, illite, kaolinite, etc. These are fluids with a thixotropic behaviour, so that when the drilling is stopped, they tend to gelify and prevent sedimentation of the cuttings around the bit. Dispersing agents or fluidifying agents can also be added to these fluids to maintain their viscosity at low values during drilling, to enable them to easily entrain the cuttings produced by the bit. Examples of dispersing and/or fluidifying agents are lignin sulfonates, lignites, synthetic polymers of (meth)acrylic acid and/or of (meth) acrylamide, etc. Details on the composition of drilling fluids or muds can be found in European patent 565,187.

For all drillings in which the normal density of the drilling fluid creates a hydrostatic pressure which exceeds the fracturing gradient (resistance of the rock to hydraulic pressure) of the formation or when the existence of natural fractures in the formation annuls the fracturing gradient, lightened mud is used to reduce the hydrostatic seal in the well. In this way, absorptions and/or damage due to the invasion of fluids in the formation are limited. Exceeding the fracturing gradient is a problem which arises in particular in deep-water drilling where there is a limited difference between this gradient and the hydrostatic load required by the drilling fluid for controlling the pore pressure of the formation.

In order to lighten drilling mud, hollow glass microspheres with a low density having an average diameter, measured according to ASTM D1214-1989, ranging from 5 to 200 $\mu$m, can be fed, in an intermediate position of the well. These microspheres reduce the density of the mud, once the larger drilling cuttings have been eliminated, to values ranging from 0.7 to 1.3 g/cm$^3$, preferably from 0.95 to 1.05 g/cm$^3$. These microspheres, capable of resisting the strong pressures present inside the wells, are available on the market as the commercial product of Minnesota Mining Manufacturing (3M), for example under the trade-name of S38HS, with an average density ranging from 0.35 to 0.41 g/cm$^3$ and an apparent density ranging from 0.19 to 0.28 g/cm$^3$. In literature, U.S. Pat. No. 2,978,340 describes a process for the preparation of hollow glass microspheres.

If the use of hollow glass microspheres solves, on one hand, the problem of the hydrostatic seal, on the other hand, it creates another problem in that it is extremely difficult to separate these bubbles from the mud in order to re-use them. As a result, large quantities of these microspheres are lost.

The Applicants have now found a method which allows the recovery of at least 70% of the hollow glass microspheres dispersed in a mixture of muds and cuttings, coming from a drilling well, which is simple as it does not require the use of any particular technological expedients.

The object of the present invention therefore relates to a process for recovering at least 70% of hollow glass microspheres having an average diameter, measured according to ASTM D1214-1989, ranging from 5 to 200 $\mu$m contained in a mixture of drilling mud and cuttings which comprises:

a) screening, if necessary, the mixture through one or more 5 to 20 mesh sieves;

b) feeding the screened mixture to one or more cyclones and/or hydrocyclones arranged in series, each of which is fed with a volume flow-rate from 1.5 to 10 times higher than the maximum nominal operating value.

At the end of the possible screening, a part of the cuttings produced by the bit during drilling, higher than 50% by weight, is substantially eliminated, leaving a fluid which has a density ranging from 0.7 to 1.3 g/cm$^3$, preferably from 0.95 to 1.05 g/cm$^3$, and a content of microspheres ranging from 1 to 30% by weight, generally from 3 to 25%. This fluid can be recovered by a high power pump, for example a multistage centrifugal pump, having a specific power equal to at least 1.5 kW/m$^3$/h, and fed to the cyclones. There are generally 1 to 3 cyclones in series.

The viscosity of the fluid, which depends on the type of well in which it is used, can be regulated to optimum pumping values by diluting the mud or thickening it with clay and/or other viscosizing agents.

The cyclones and/or hydrocyclones used in the process object of the present invention are traditional devices described, for example, in "Ullmann's Encyclopedia of Industrial Chemistry", Fifth Edition, 1988, Vol. B2 or in "Hydrocyclones", L. Svarovsky Holt, Rinehart and Winston, 1984, and are capable of treating dispersions and/or suspensions of solids with nominal operating flow-rates ranging from 3 to 30 m$^3$/h.

The cyclones and/or hydrocyclones, also commonly called cyclone separators, are generally dimensioned so as to guarantee a flow leaving the base, rich in heavy solids (underflow, UF) and a counter-flow leaving the head, rich in light fraction (overflow, OF). In the process object of the present invention, the overflow leaving the first cyclone can be fed in turn to one or more cyclones in series, operating under analogous conditions to the first, if a forced separation of the microspheres from the mud is necessary. In any case, operating either with a single cyclone or with several cyclones arranged in series, a recovery of hollow glass microspheres in the overflow equal to at least 70% of the microspheres fed and even over 80%, can be obtained. This stream can be re-used as such and fed to the well to lighten the drilling mud or it can be subjected to further treatment, for example by sedimentation/flotation in water or another liquid, to recover the substantially mud-free microspheres.

Two illustrative and non-limiting examples are provided for a better understanding of the present invention and for its embodiment.

EXAMPLE 1

An amount of mud was prepared in a 10 m$^3$ tank, having the following composition:

| Products | Quantity (kg) | weight % |
| --- | --- | --- |
| Water | 4000 | 64.0 |
| KCl | 150 | 2.4 |
| Starch | 50 | 0.8 |
| Xantanes | 25 | 0.4 |
| Antibacterial agent | 6 | 0.1 |
| Cuttings | 1439 | 23.0 |
| S38HS Microspheres (3M) | 579 | 9.3 |
| Total | 6250 | 100.0 |

The density of the mud was 0.927 g/cm$^3$ which, by dilution, was regulated to 0.956 g/cm$^3$.

The mud was fed, by means of a pump having a power of 90 kW, to a cyclone with flow-rates of 38 and 60 m$^3$/h. The maximum nominal operating flow-rate of the cyclone was 21 m$^3$/h.

A stream of fluid (OF) in which the microspheres are concentrated, is recovered from the head of the cyclone, whereas the cuttings are concentrated in the stream at the bottom (UF). The results obtained are indicated in Table 1.

TABLE 1

| Flow-rate fed (Inlet) (m$^3$/h) | Flow-rate OF (m$^3$/h) | OF/Inlet (%) | Recovery of microspheres (%) |
| --- | --- | --- | --- |
| 38 | 10 | 26 | 70 |
|  | 13 | 34 | 74 |
| 60 | 16 | 27 | 77 |
|  | 19 | 32 | 81 |

EXAMPLE 2

Mud prepared and diluted as in example 1, was used for running a test with two cyclones in series with a maximum nominal flow-rate of 11 m$^3$/h and 21 m$^3$/h respectively, the second cyclone being fed with the OF of the first. The UF of the first cyclone was regulated so as to form about 13% of the flow-rate of the flow-rate of the fluid fed. The power of the pump was 90 kW. The results obtained are indicated in Table 2.

TABLE 2

| Flow-rate fed (Inlet) (m$^3$/h) | Flow-rate OF (m$^3$/h) | OF/Inlet (%) | Recovery of microspheres (%) |
| --- | --- | --- | --- |
| 55 | 14 | 56 | 76 |
|  | 18 | 33 | 79 |

The invention claimed is:

1. A process for recovering at least 70% of hollow glass microspheres having an average diameter, according to ASTM D1214-1989, ranging from 5 to 200 μm contained in a mixture of drilling mud and cuttings which comprises:

a) optionally screening, the mixture through one or more 5 to 20 mesh sieves;

b) feeding the (screened) mixture to one or more cyclones and/or hydrocyclones arranged in series, each of which is fed with a volume flow-rate from 1.5 to 10 times higher than the maximum nominal operating value to obtain an underflow rich in heavy solids and an overflow rich in light fraction.

2. The process according to claim 1, wherein the mixture fed to the cyclones and/or hydrocyclones has a density ranging from 0.7 to 1.3 g/cm$^3$ and a content of microspheres ranging from 1 to 30% by weight.

3. The process according to claim 2, wherein the overflow is subjected to sedimentation/flotation in water or another liquid, to recover substantially mud-free microspheres.

4. The process according to claim 2, wherein there are from 1 to three cyclones.

5. The process according to claim 2, wherein the one or more cyclones and/or hydrocyclones have nominal operating flow-rates ranging from 3 to 30 m$^3$/h.

6. The process according to claim 2, wherein the mixture is screened.

7. The process according to claim 1, wherein the overflow is subjected to sedimentation/flotation in water or another liquid, to recover substantially mud-free microspheres.

8. The process according to claim 7, wherein there are from 1 to three cyclones.

9. The process according to claim 8, wherein the mixture is screened.

10. The process according to claim 7, wherein the one or more cyclones and/or hydrocyclones have nominal operating flow-rates ranging from 3 to 30 m$^3$/h.

11. The process according to claim 1, wherein there are from 1 to three cyclones.

12. The process according to claim 4, wherein the one or more cyclones and/or hydrocyclones have nominal operating flow-rates ranging from 3 to 30 m$^3$/h.

13. The process according to claim 11, wherein the cyclones have nominal operating flow-rates ranging from 3 to 30 m$^3$/h.

14. The process according to claim 13, wherein the mixture is screened.

15. The process according to claim 1, wherein the mixture fed to the cyclones and/or hydrocyclones has a density ranging from 0.7 to 1.3 g/cm$^3$ and a content of microspheres ranging from 3 to 25% by weight.

16. The process according to claim 1, wherein the mixture fed to the cyclones and/or hydrocyclones has a density ranging from 0.95 to 1.05 g/cm$^3$ and a content of microspheres ranging from 1 to 30% by weight.

17. The process according to claim 1, wherein the mixture fed to the cyclones and/or hydrocyclones has a density ranging from 0.95 to 1.05 g/cm$^3$ and a content of microspheres ranging from 3 to 25% by weight.

18. The process according to claim 1, wherein the mixture is screened.

* * * * *